(12) United States Patent
Ferreira et al.

(10) Patent No.: US 8,650,892 B2
(45) Date of Patent: *Feb. 18, 2014

(54) APPARATUS AND METHODS FOR CREATING PURIFIED PORTABLE WATER FROM THE ATMOSPHERE

(71) Applicant: EcoloBlue, Inc., Miami, FL (US)

(72) Inventors: Wayne Ferreira, Lafayette, CA (US); Henri-James Tieleman, Miami, FL (US)

(73) Assignee: EcoloBlue, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,469

(22) Filed: Oct. 22, 2012

(65) Prior Publication Data

US 2013/0042642 A1    Feb. 21, 2013

Related U.S. Application Data

(63) Continuation of application No. 13/319,676, filed as application No. PCT/US2011/020077 on Jan. 4, 2011, now Pat. No. 8,302,412, said application No. 13/319,676 is a continuation-in-part of application No. 12/747,902, filed as application No. PCT/US2009/061811 on Oct. 23, 2009, now Pat. No. 7,861,544.

(60) Provisional application No. 61/365,068, filed on Jul. 16, 2010, provisional application No. 61/115,534, filed on Nov. 17, 2008.

(51) Int. Cl.
*F25D 21/00* (2006.01)

(52) U.S. Cl.
USPC ............... 62/150; 62/272; 62/389; 426/67

(58) Field of Classification Search
USPC .......... 62/92, 150, 272, 285, 389; 426/66, 67; 222/146.6

See application file for complete search history.

(56) References Cited

U.S. PATENT DOCUMENTS

| 5,517,829 A | 5/1996 | Michael |
| 6,182,453 B1 | 2/2001 | Forsberg |

(Continued)

FOREIGN PATENT DOCUMENTS

| JP | 2002-166269 A | 6/2002 |
| KR | 10-2010-0035280 A | 4/2010 |

(Continued)

OTHER PUBLICATIONS

Written Opinion for International Application No. PCT/US2009/061811 mailed Jun. 7, 2010.

(Continued)

*Primary Examiner* — Marc Norman
*Assistant Examiner* — Paolo Gonzalez
(74) *Attorney, Agent, or Firm* — Oppedahl Patent Law Firm LLC (57) ABSTRACT

Disclosed is a system to extract water moisture from the atmosphere, highly purify and condition the extracted water, and provide beverages for human consumption. In one embodiment, the device collects water-vapor condensation from filtered intake air, and then subjects the condensate to a series of purification filters and to a sterilization process in order to produce drinking water. The system may then use the water produced to provide carbonated drinks, flavored drinks, coffee drinks, or ice. The system may also play music and charge a portable electronic device. The disclosed system may incorporate the variations in different combinations.

32 Claims, 7 Drawing Sheets

(56) References Cited

U.S. PATENT DOCUMENTS

| | | |
|---|---|---|
| 6,343,479 B1 | 2/2002 | Merritt |
| 6,644,060 B1 | 11/2003 | Dagan |
| 6,684,648 B2 | 2/2004 | Faqih |
| 6,993,928 B2 | 2/2006 | Akkad |
| 7,272,947 B2 | 9/2007 | Anderson et al. |
| 7,373,787 B2 | 5/2008 | Forsberg et al. |
| 7,540,167 B2 | 6/2009 | Murphy et al. |
| 7,726,138 B2 | 6/2010 | Bailey |
| 2003/0159457 A1 | 8/2003 | Faqih |
| 2004/0040322 A1 | 3/2004 | Engel et al. |
| 2005/0284167 A1 | 12/2005 | Morgan et al. |
| 2007/0017234 A1 | 1/2007 | Moulder et al. |
| 2007/0039345 A1 | 2/2007 | Forsberg et al. |
| 2007/0175234 A1 | 8/2007 | Pruitt |
| 2008/0104978 A1 | 5/2008 | Kim |
| 2008/0164796 A1 | 7/2008 | McCoy et al. |
| 2008/0184720 A1 | 8/2008 | Morgan et al. |
| 2009/0211275 A1 | 8/2009 | Castanon Seoane |

FOREIGN PATENT DOCUMENTS

| | | |
|---|---|---|
| WO | 2006/029249 A2 | 3/2006 |
| WO | 2006/049387 A1 | 5/2006 |
| WO | 2008/056223 A1 | 5/2008 |
| WO | 2010/056486 A2 | 5/2010 |
| WO | 2012/009024 A1 | 1/2012 |

OTHER PUBLICATIONS

International Search Report for International Application No. PCT/US2009/061811 mailed Jun. 7, 2010.

Written Opinion for International Application No. PCT/US2011/20077 mailed Sep. 8, 2011.

International Search Report for International Application No. PCT/US2011/20077 mailed Sep. 8, 2011.

APPARATUS AND METHODS FOR CREATING PURIFIED PORTABLE WATER FROM THE ATMOSPHERE

CROSS-REFERENCE TO RELATED APPLICATIONS

This application is a continuation of U.S. application Ser. No. 13/319,676 filed Nov. 11, 2011, now U.S. Pat. No. 8,302,412, which is a section 371 of international PCT/US11/20077, filed Jan. 4, 2011 and non-provisional of U.S. application No. 61/365,068 filed Jul. 16, 2010, which is a continuation-in-part of U.S. application Ser. No. 12/747,902 filed Jun. 14, 2010 now U.S. Pat. No. 7,861,544, which is a section 371 of international PCT/US09/61811 and non-provisional of U.S. application No. 61/115,534, all of which are hereby incorporated by reference for all purposes.

BACKGROUND OF THE INVENTION

The demand by consumers for good-tasting, pure and safe, economical, and environmentally friendly sources of drinking water has resulted in an ever-growing market for purified bottled water, including water packaged in individual-sized plastic bottles and dedicated water coolers that requires periodic delivery and change-out of large water bottles. Not only is either of the preceding water-delivery methods in efficient and relatively expensive, but they each expend precious water-supply resources. Moreover, individual purified-water bottles are usually made of plastic and are rarely recycled, which results in undesirable solid waste to populate landfills.

One source of water that often goes unappreciated and generally uncapitalized on is the humidity in the atmosphere. While the prior art has long included room dehumidifiers, which condenses humidity in the air and produces waste water to be later dumped, these dehumidifiers do not subject the condensate to specialized filtration or other processing to make the water suitable and/or better tasting for human consumption.

In addition, many consumers enjoy bottled soda water and flavored drinks, the delivery of which presents the same problems as was discussed for non-carbonated purified water bottles already discussed above. Therefore, it would be desirable to create a convenient, economical, and environmentally friendly means to deliver safe, pure, good-tasting carbonated water for human consumption either by itself or in combination with other flavorings and substances.

In addition, many consumers enjoy ice cubes and all kinds of coffee. Therefore, it would be desirable to create a convenient, economical, and environmentally friendly means to deliver safe, pure, good-tasting carbonated water, coffee, and ice for human consumption.

Further, consumers enjoy listening to music while doing all sorts of daily activities. A versatile environmentally conscious apparatus that has a docking station with speakers which allows the consumer to charge, recharge, or play any MP3 player, any IPOD or any IPHONE while making a pot of coffee, a carafe of sparkling soda water or a bucket of ice would be a very attractive device. The system functions described above might not be provided all at once but sub-combinations can exist.

BRIEF SUMMARY OF THE INVENTION

The inventive disclosures contained herein include a system designed to extract water moisture from the atmosphere, highly purify and condition the extracted water, and provide optional carbonation of the extracted water for human consumption. The highly purified water can also be used to make ice or coffee for human consumption. The top of the apparatus has a docking port and speaker system compatible with a MP3 player, an IPOD, or an IPHONE. The docking port may also be compatible with other portable electronic audio devices and smart-phones.

In one embodiment, the device collects water-vapor condensation from filtered intake air, then subjects the condensate to a series of purification filters and to a sterilization process in order to produce drinking water, while also providing a means to combine the purified water with $CO_2$ gas to facilitate dispensing carbonated water and/or carbonated drinks. This highly purified carbonated water is also conducive to the health of consumers.

In a second embodiment, the device collects water-vapor condensation from filtered intake air, then subjects the condensate to a series of purification filters and to a sterilization process in order to produce drinking water, while also providing a means to combine the purified water with ground coffee.

In a third embodiment, the device collects water-vapor condensation from filtered intake air, then subjects the condensate to a series of purification filters and to a sterilization process in order to produce drinking water, while also providing a means to freeze the purified water creating ice cubes.

In some alternative embodiments, where there is very low humidity and/or ambient temperature, which said environment is not conducive to the production of very much condensate for water production, the device can be connected directly to an external tapwater source, wherein the tap water is subjected to the device's purification filtration and sterilization processes, as well as the optional carbonation, coffee-making, and/or ice-making processes.

The preceding summary is only intended to provide a very brief overview of the inventive disclosures contained within this patent application. The preceding brief summary is not intended to recite the entirety of the inventive concepts disclosed herein.

DETAILED DESCRIPTION

One embodiment includes a system designed to extract water moisture from the atmosphere, highly purify and condition the extracted water, and provide and optional carbonation of the extracted water for human consumption. The device collects water-vapor condensation from filtered intake air, then subjects the condensate to a series of purification filters and to a sterilization process in order to produce drinking water, while also providing a means to combine the purified water with $CO_2$ gas to facilitate dispensing carbonated water and/or carbonated drinks.

Alternatively, where there is very low humidity and/or low ambient temperature, which said environment is not conducive to the production of very much condensate for water production, the device can be connected directly to an external tap-water source, wherein the tap water is subjected to the device's purification filtration and sterilization processes, as well as the optional carbonation process.

Refer to FIGS. 1-5. Some embodiments incorporate the fan/blower-powered [5] intake of filtered air [9], which is directed through an evaporator-condensation means [4, 2], such as an aluminum-fin evaporator, causing condensate to gravity-drain into a collector means [6]. In one embodiment, the collector means [6] is a highly polished, plate-shaped, detachable water retainer, wherein the highly polished surface facilitates the gravity flow of condensate water into the lower water tank [12]. The collected water condensate is then pumped [15] through a series of filters (such as activated carbon filters, zeolite filters, and/or far-infrared filters mineralization) [16, 18] and through a reverse-osmosis filter [17]. The reverse-osmosis filter [17] is also connected to a wastewater proportion controller [19] that allows a user to control how much waste water the user would like the system to produce. The waste-water proportion controller [19] is connected to the collector means [6] and waste-water outlet via a three-way valve [20].

In an embodiment, the filtered water is then subjected to ultra-violet-light sterilization [26, 28] and temperature condition (cooling [25] or heating [35]). Finally, the device provides the user with the option of directing the purified water and $CO_2$ gas [A12] into a gas-water-diffusion chamber [A1], which then can provide the user with the purified, sparking water from the output [31]. Some embodiments also incorporate both a heating means [34, 35, 36] and a refrigeration means [1,25,37] so that end users can opt to dispense either heated water or cooled water. Some embodiments only provide a means to dispense cooled water, while even other embodiments dispense the water at ambient temperature.

Figure 1:
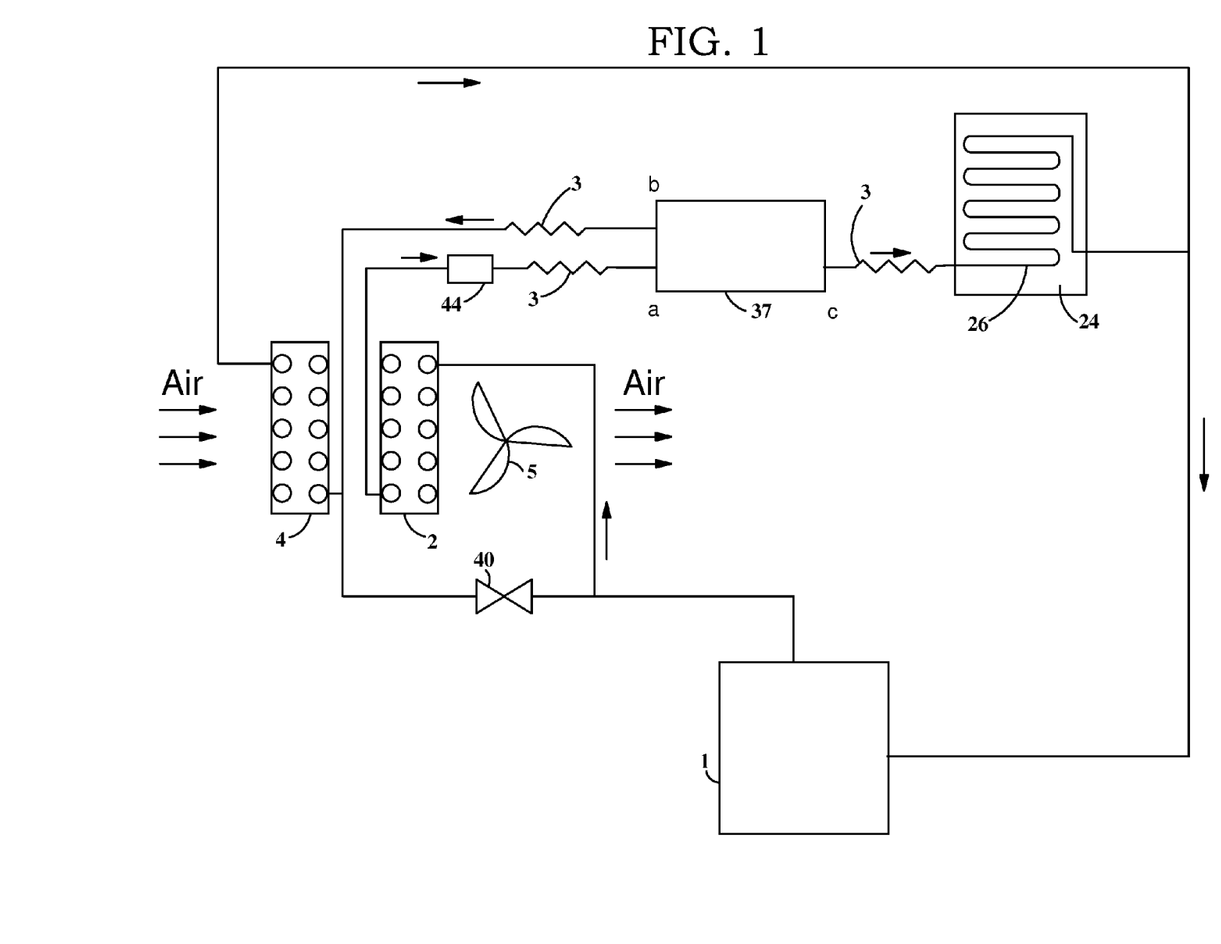
FIG. 1 depicts a simplified one-line diagram of one embodiment of the refrigeration system that extracts water from the atmosphere, which shows the fluid flow through major components.
Figure 2:
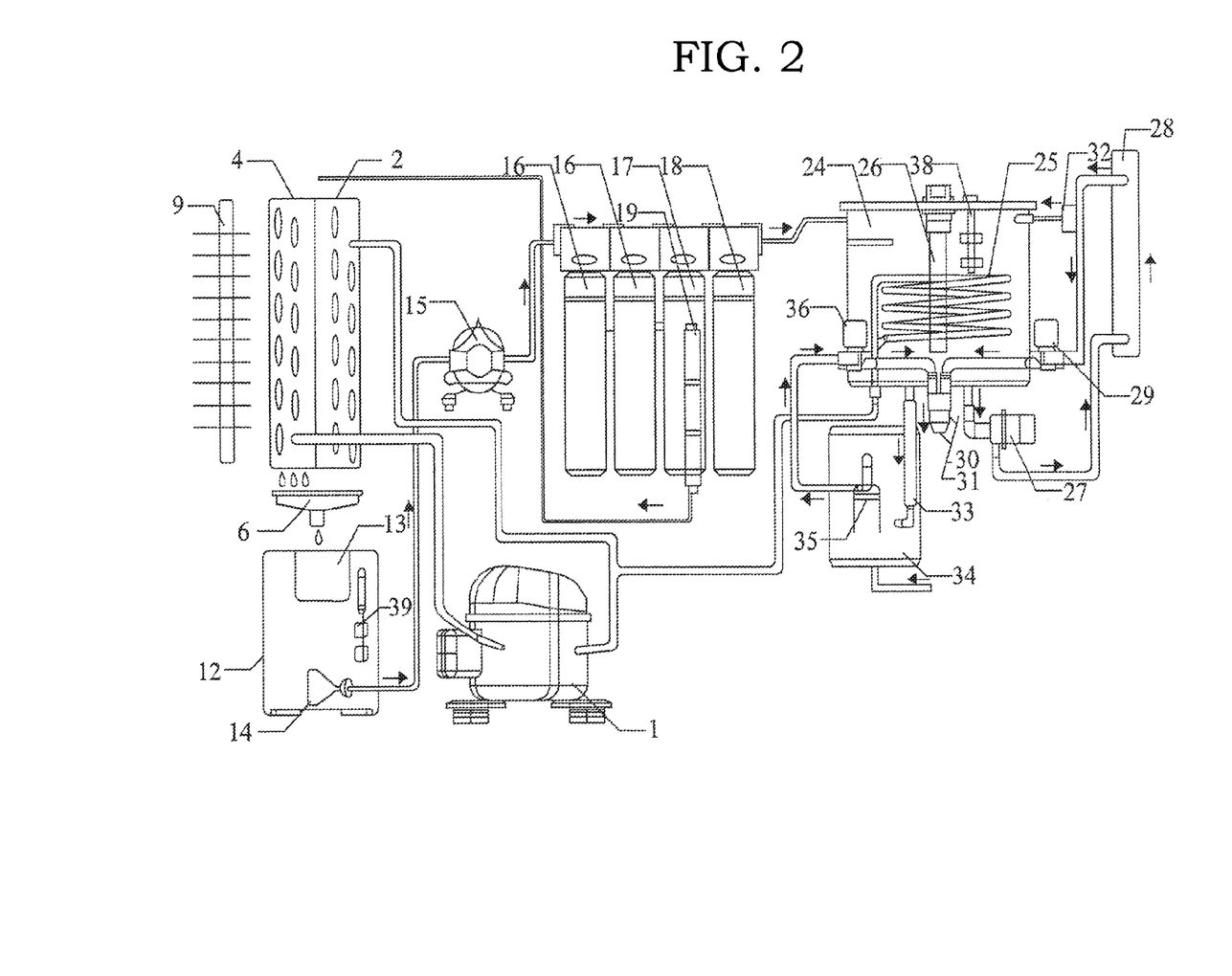
FIG. 2 shows a diagram of one embodiment of the system that extracts water from the atmosphere, depicting the functional relationships of major components that process the gas and liquids through filtration and sterilization to produce purified water.
Figure 3:
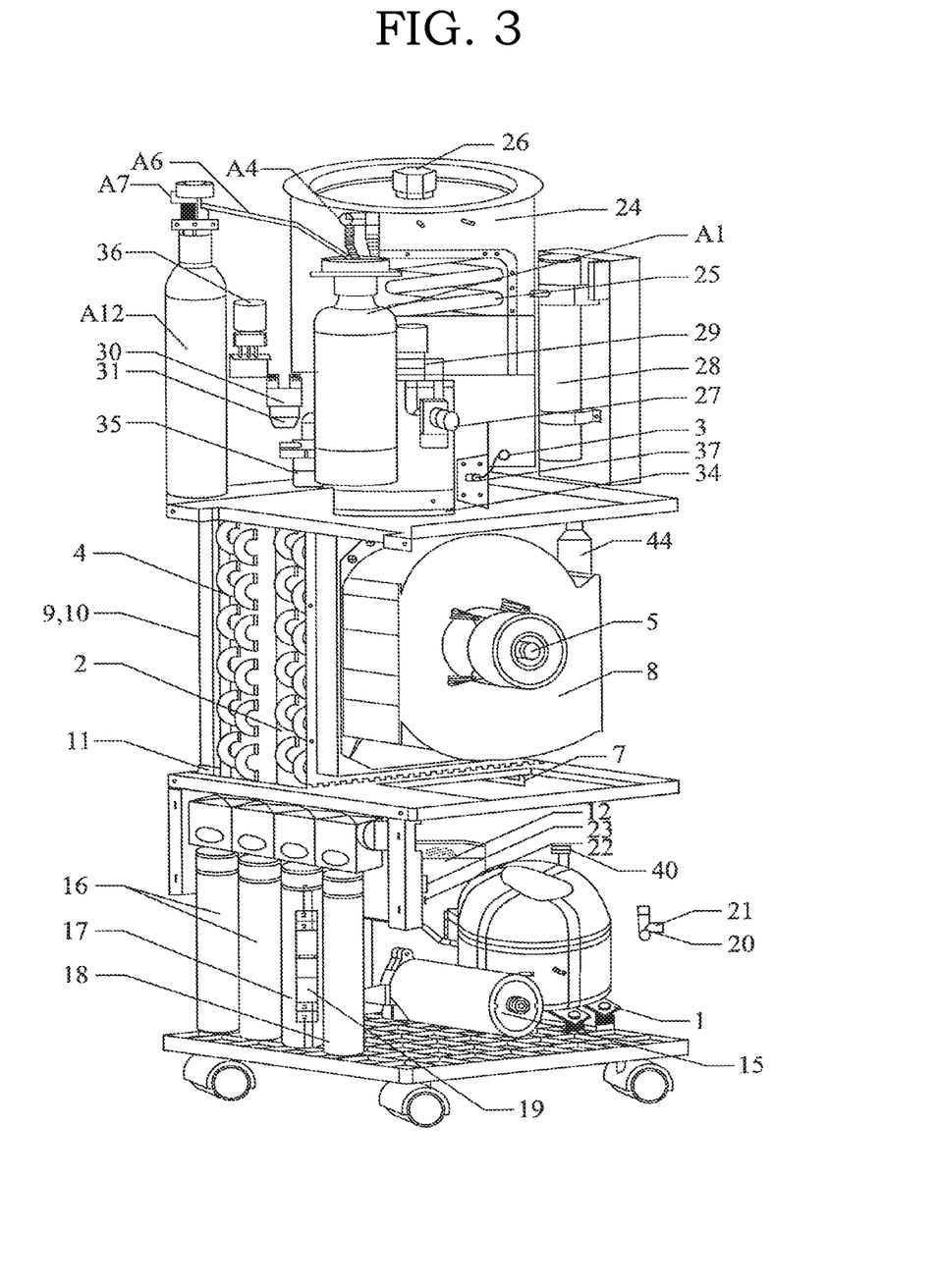
FIG. 3 depicts one embodiment of the inventive disclosure as an isometric view of major internal components.

In some embodiments, the various subsystems such as the heating and cooling systems, the sterilization system, and defrosting systems are controlled by an intelligent, single-chip control system. The single-chip control system uses inputs associated with water temperature, water level [38], and defrosting temperature to decide when to actuate various control devices, such as the solenoid cooling valve [37].

In some embodiments, the refrigeration systems comprise a typical refrigeration cycle, including refrigerant compressed by a compressor [1] into a liquid, whereby the compressed refrigerant passes through the capillary aluminum-fin (or equivalent) condenser [2] and is vaporized, thus removing heat from the medium surround the evaporator. Notably, in some embodiments, a common compressor is used to supply refrigerant to both the evaporator-condenser [4, 2] and to the cooling coils [25] in the upper water tank [24], which is advantageous to both reduce the internal room required to house components and to conserve resources. One or more solenoid-operated control valves are used to direct refrigerant flow.

In an embodiment, the condensate-collection system comprises a condenser fan [5] with a collector [6], wherein the fan forces intake ambient air through the cold evaporator fins [4], on which liquid water will condense from the air and deposit on said fins, then gravity-drain into the collector [6] and into the lower water tank [12].

In an embodiment, the compressor [1] sucks-in gaseous refrigerant from evaporator [4] or from the cooling loop [25]. The compressed, hot refrigerant usually passes through condenser [2], and from there to restriction (copper filter) [44]. The refrigerant then passes through solenoid cooling valve [37]. If solenoid cooling valve [37] is not electrically energized, then the refrigerant passes through outlet [b] (see FIG. 1) and from there to the evaporator [4], where the refrigerant is permitted to expand and thus chills air passing through the evaporator [4]. If solenoid cooling valve [37] is electrically energized, the refrigerant passes through outlet [c] and from there to cooling loop [25] (contained within upper water tank [24]), where the refrigerant is permitted to expand and thus chills water in upper water tank [24].

In one embodiment, the compressor [1] is a high-efficiency, variable-speed compressor whose operation, including energizing times and speed, are controlled by a an inverter-controller. Preferably, the high-efficiency, variable-speed compressor (with controller) has characteristics comparable to those of a Panasonic® Model 6TD075XAA41. Because the compressor [1] is the largest electrical load on the system (typically, it represents almost 50% of the energy consumption of the system to generate water from the atmosphere), it is advantageous to minimize its cycling operations as allowed by ambient conditions, such as temperature and humidity. Moreover, the employment of such a controllable, high-efficiency compressor [1] facilitates the use of a solar-energy source such that the machine can be stationed remotely and independent from any external power source. In a related embodiment, the system is electrically powered by one or more solar panels rated at rated for at least 300 W.

In another embodiment, the intake ambient air previously mentioned leaves the evaporator [4] and passes through the condenser [2], which is hot, and the air absorbs heat from the condenser [2]. In another embodiment, the compressor [1] can pump hot refrigerant into the evaporator [4] in order to defrost the evaporator fins [4], using a defrost sensor (omitted for clarity in the figures) that senses a frost temperature in the evaporator [4]. If a excessive-frost condition arises, then solenoid-operated control valve [40] is opened, and hot refrigerant is ported directly into the evaporator [4] to defrost the evaporator.

In one embodiment, the lower water tank [12] is of a detachable design located in a drawer to facilitate easy cleaning and maintenance. In another embodiment, the lower water tank [12] also comprises a preliminary filter [13] (which in some embodiments is comprised of activated carbon or zeolite, to remove the smell of condensate water and ammonia). In another embodiment, the lower water tank also comprises a particle filter [14], which is used to help protect the one or more water pumps [15].

In an embodiment, to prevent secondary pollution from Pseudomonas resulting from evaporation at the brass fins due to pinna heat and water contact, and at the same time prevent corrosion at the evaporator [4], the evaporator [4] surface is coated with non-toxic, anti-corrosion materials that comply with applicable food standards for paint or a PTFE protective layer. This helps avoid the condensation of heavy metals into the water, which improves the safety of drinking water. Moreover, the coating promotes the rapid collection of water.

In an embodiment, in order to prevent large particulate matter and dust into the lower water tank [12], and at the same time to prevent mold on the evaporator [4] surfaces, the air intake is equipped with an anti-static, anti-mold air filter [9, 10]. Said air filters are installed in the air filter guide [11], providing convenient access for cleaning or changing-out.

In one embodiment, the water pump [15] pumps water through the activated carbon filters [16], the reverse-osmosis filter [17], and the zeolite filter [18]. The reverse-osmosis membrane filter [17] has an aperture of approximately ≤0.0001 µm in order to filter out bacteria, viruses, and heavy metals, as well as to remove unwanted smells. This filtration helps ensure that the output water, whether be sparking water or non-sparkling water, meets applicable standards for drinkability. Wastewater output port [19] is employed in a backwash of the reverse-osmosis filter [17]. Filtered water, suitable for drinking, reaches the upper tank [24], where it can be chilled.

In another embodiment, the lower-water tank [12] has a water level sensor [39]. Whenever the water level sensor [39] detects that the tank [12] is substantially full, according to a predefined setpoint, then the evaporator [4] is not chilled by way of manipulation of the one or more solenoid-operated control valves [40], since the addition of more condensate to the tank [12] would risk overfilling the tank [12].

In an embodiment, each tank water-level sensor [38, 39] can adopt a design that includes a two-line water level sensor with a built-in magnet float, which can detect water level in different locations with a closure of a different reed switch to determine the value of the water level.

In an embodiment, the cooling loop [25] is used to control the water temperature in the upper water tank [24] to within the range of 2-15° C., which helps inhibit bacterial growth and reproduction. At the same time, in another embodiment, the upper water tank [24] is equipped with ultra-violet disinfection device [26, 28] to aid in water sterilization, which subjects the water within the upper water tank [24] to ultra-violet light. In one embodiment, the ultra-violet sterilization device [26, 28] has an effective sterilization rate of at least 99.99%, using a wavelength in a range of 253-255 nm, for example 254 nm. In an embodiment, the ultra-violet sterilization device [26] is controlled by the single-chip control system to periodically turn on as water within the upper water tank [24] is circulated by pump [27] through the sterilization chamber [28] and delivered back to upper water tank [24] in order to perform sterilization from time to time and to prevent bio-film growth in the tubing/piping.

In another embodiment, potable water is released through output filter [30] to outlet valve [31] by electrically operated valve [29], after having passed through the sterilization chamber [28].

In an embodiment, to supply hot water, water is able to drain through line [33] from upper water tank [24] into hot water tank [34], which contains an electrical heating element. Hot, potable water is pumped by water pump [35] through an electrically operated valve [36], and through output filter [30] to outlet valve [31] via electrically operated valve [29].

In one embodiment, another ultra-violet disinfection device is used for the user-selected output water stream (that is, hot or cold, sparkling or non-sparkling, water) through outlet valve [31].

In an embodiment, the upper water tank [24] has water-level sensor [38]. Whenever the water-level sensor [38] detects that the upper water tank [24] is substantially full, according to a predetermined setpoint, then the water pump [15] is not operated, as this would overfill the upper water tank [24].

In an embodiment, the bank of carbon filters are configured such that they are easily accessible in the device to facilitate replacement.

In one embodiment, the water-heating tank [34] and supporting one-way valve [36] and water pump [35] are used to provide hot water within a range of 50-95° C., as controlled by the single-chip controller.

In another embodiment, the device employs a water-leakage-detection switch, which will shutdown the system if leakage within the device cabinet is detected.

In an embodiment, a user controls the device's mode of operation by way of a digital display and control system [42], which can employ either a button or touch-screen input device. Said system provides a means for a user to set the operating temperatures for the cooling and heating of the water to be output, as well as defrosting cycles. Additionally, said system provides a means for the end-user to select whether the output water is to be carbonated or not. In addition, the display provides notifications to the end-user of when filter replacements are due/recommended, the activation of the sterilization process, the upper and lower limit of the working humidity. Said system can also be programmed to save energy and shutdown key components, such as the compressor [1], when low-humidity and/or low-temperature conditions are detected. Finally, the display also provides troubleshooting information in the event of a system failure.

In another embodiment, the device can be connected to an external potable water source, which is advantageous for times when either the atmospheric conditions are such that there is low temperature and/or low humidity. In this case, the external water source can still take advantage of the device's onboard systems for high filtration, sterilization, temperature conditioning, and diffusion with CO2 gas for the formation of sparkling water.

Figure 4:
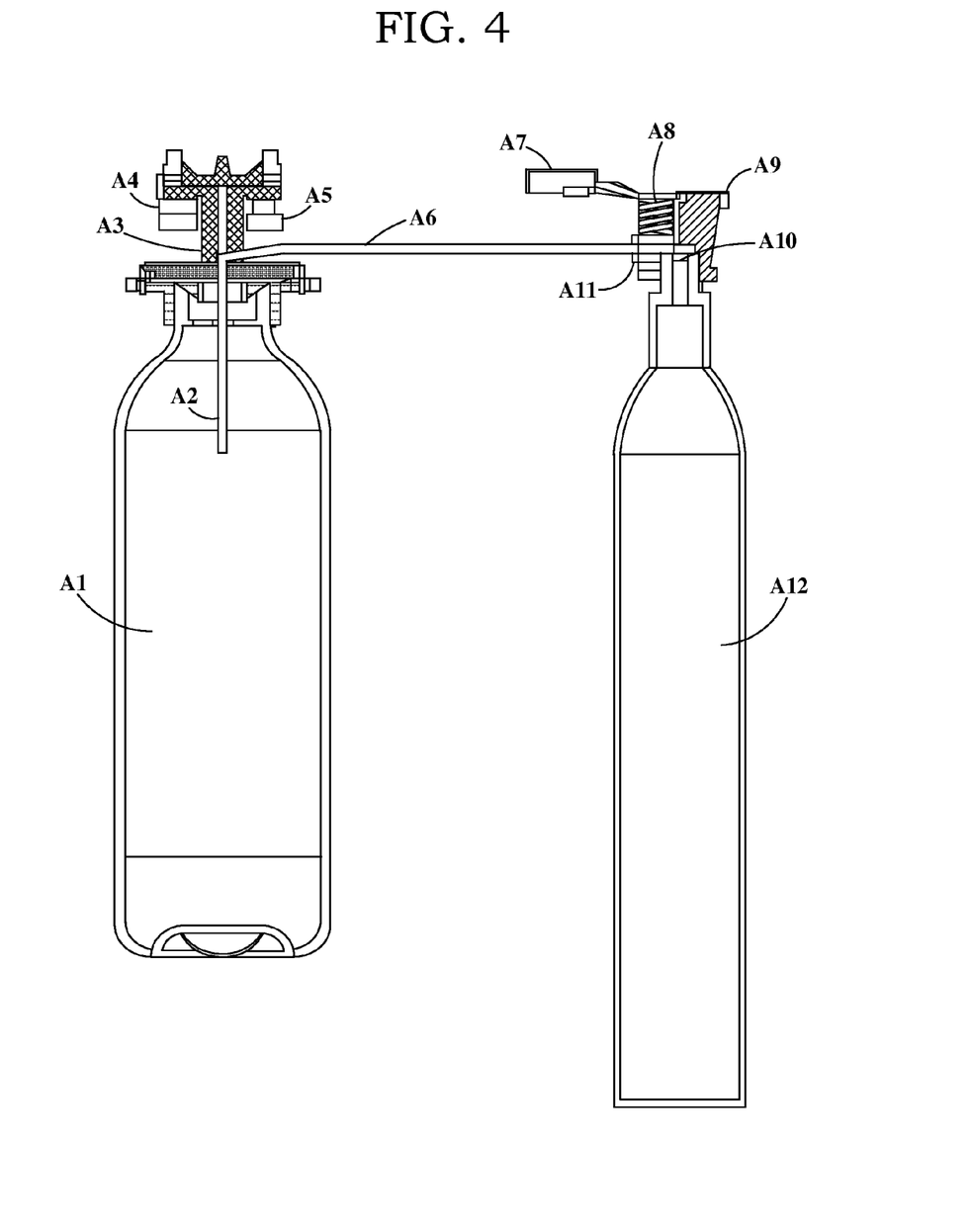
FIG. 4 depicts a $CO_2$ gas cylinder and the gas-diffusion chamber.
Figure 5:
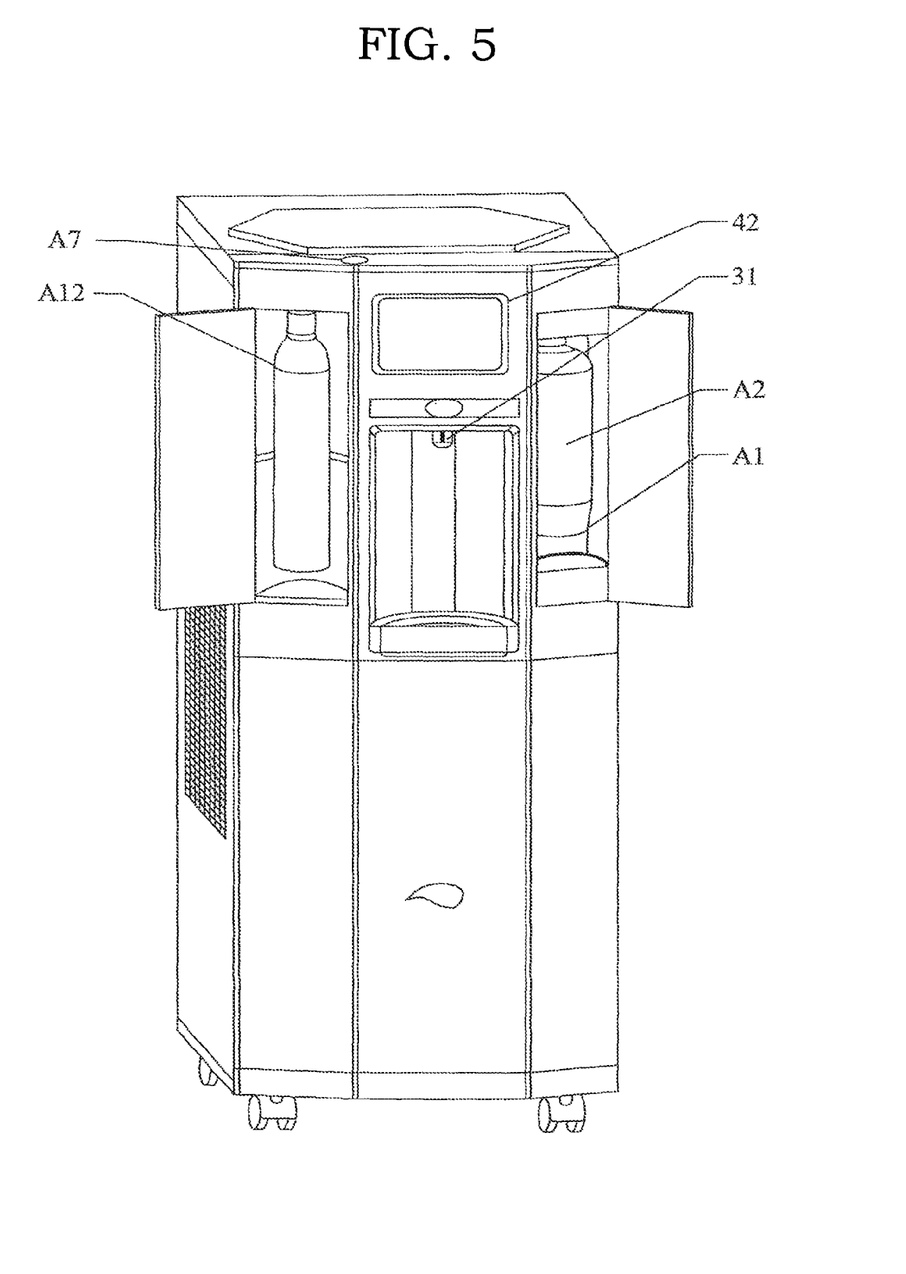
FIG. 5 depicts the front panels of one embodiment of the inventive disclosure, including the locations of a CO2 gas cylinder and the gas-diffusion chamber.

In an embodiment, the $CO_2$ gas is mixed with output water to produce carbonated drinks, through the installation of one or more CO2 gas cylinders [A12] and a gas-diffusion chamber [A1], which are connected at their tops via a gas line [A6]. The $CO_2$ gas cylinder(s) [A12] is(are) equipped with a one-way valve [A10], having a valve stem [A9], and a pressure-relief valve [A11]. The $CO_2$ gas enters the gas-diffusion chamber [A1] via a one-way valve [A10] and the trachea [A2]. The gas-diffusion chamber [AI] is equipped with an inlet valve [A3] and a pressure-relief valve [A5]. An alarm is set off if the relief-valve [A5] spring pressure setting is set too high. Lever [A7] is urged upwards by spring [A8]. If a user causes lever [A7] to be depressed, then the valve stem [A9] is pushed downward, releasing gas into gas line [A6]. From there, the gas passes through throat [A2] into water contained in the gas-diffusion chamber [A1]. Eventually, release valve [A4] opens (the user will also hear the sound of filling as the gas-diffusion chamber realizes a saturated content of purified water and $CO_2$ gas), signaling to the user to release lever [A7]. Thus, in one embodiment, a user may unscrew the gas-diffusion chamber [A1], position the chamber under outlet valve [31], may dispense potable water into the gas-diffusion chamber [A1], screw the gas-diffusion chamber [A1] back into place, and then depress lever [A7] until signaled to release lever [A7] by a sound at release valve [A4]. In some embodiments, a user can get the output purified carbonated water via a separate output valve at the top of the gas-diffusion chamber [A1]. In other embodiments, a user can cause a solenoid control valve (via control panel [42]) to align the source of the output from valve [31] to be directed from the gas-diffusion chamber [A1].

In other embodiments, the gas-diffusion chamber [A1] is configured to receive purified water from the machine directly while in a depressurized state without direct user intervention, wherein a solenoid-operated control valve allows purified water to enter the gas-diffusion chamber [A1] until a predetermined level is reached. Said predetermined level can be detected by way of a water-level detector, such as one of a magnetic-float type as described earlier in this specification, or a pressure sensor. The gas-diffusion chamber [A1] is then able to be pressurized to a predetermined amount with $CO_2$ gas from $CO_2$ gas cylinder(s) [A12]. Said predetermined amount of pressurization, which in turn translates to the level of carbonation (saturation) of the water, can be detected and controlled by way of a pressure sensor or a water-level (expansion) detector within the gas-diffusion chamber [A1]. Then, the output of the machine can provide a purified sparkling-water output via throat [A2] and output valve [31]. When first used, the $CO_2$ gas cylinder(s) [A12] tightens up on the valve seat, resulting in no leakage. Additionally, the gas-diffusion chamber [A1] once primed with the purified water-and-$CO_2$ mixture also tightens up on its seals to prevent leakage.

In alternative embodiments, flavorings, including but not limited to fruit juices, can be added to the gas-diffusion chamber [A1] in addition to the purified water, thus resulting in potable, flavored carbonated drinks. Flavorings may also be added at, or before, the outlet valve [31] for other beverages. Flavorings might include fruit juice, vegetable juice, sugar-based syrups, low-calorie syrups, calorie-free sweeteners, dairy products, and extracts from herbs and spices.

In one embodiment, the system contains one or more vessels for distilled spirits. These may include liqueurs or other alcoholic beverages. The system may combine the alcohol with water, carbonated soda water, ice, flavorings, coffee drinks, and/or other alcohols to provide a cocktail or other mixed drink. In one embodiment the mixed drink is prepared according to a pre-programmed recipe. In another embodiment, the mixed drink is prepared according to a recipe program received through the portable electronic device.

Figure 6:
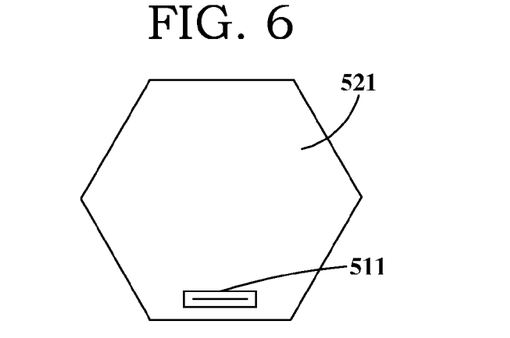
FIG. 6 shows a top view of one embodiment of the system showing the docking station for any MP3 player, any IPOD, and any IPHONE.

FIG. 6 is a top view of one embodiment of the system 521 showing the docking station 511 for any MP3 player, any IPOD and any IPHONE.

Figure 7:
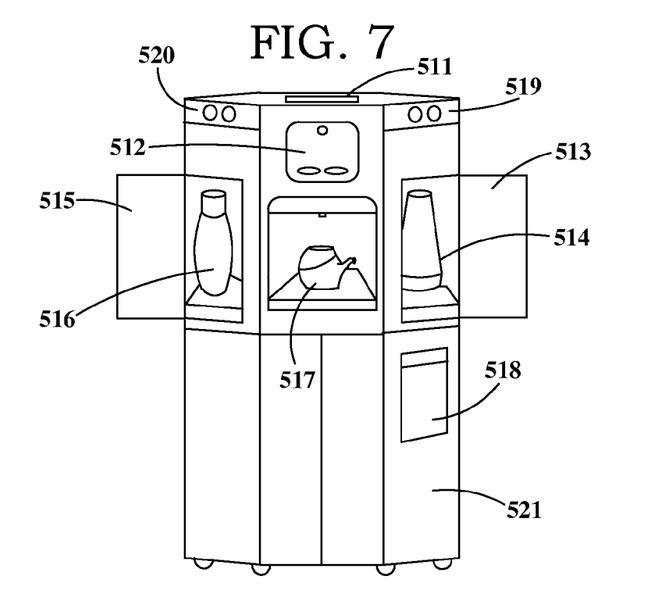
FIG. 7 shows a diagram of the front view of one embodiment of the system, depicting all of the components, such as the two speakers, LCD display, two doors, a $CO_2$ gas cylinder, a soda water carafe, a coffee pot, and an ice drawer.

FIG. 7 shows a diagram of the front view of one embodiment of the system 521, depicting components, such as the two audio speakers 519, 520, LCD display 512, two doors 513, 515, a $CO_2$ gas cylinder 516, a soda water carafe 514, a coffee pot 517, and an ice drawer 518.

Figure 8:
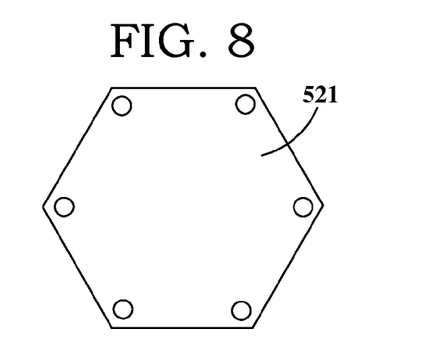
FIG. 8 shows a bottom view of one embodiment of the system.

FIG. 8 is a bottom view of one embodiment of the system 521.

Figure 9:
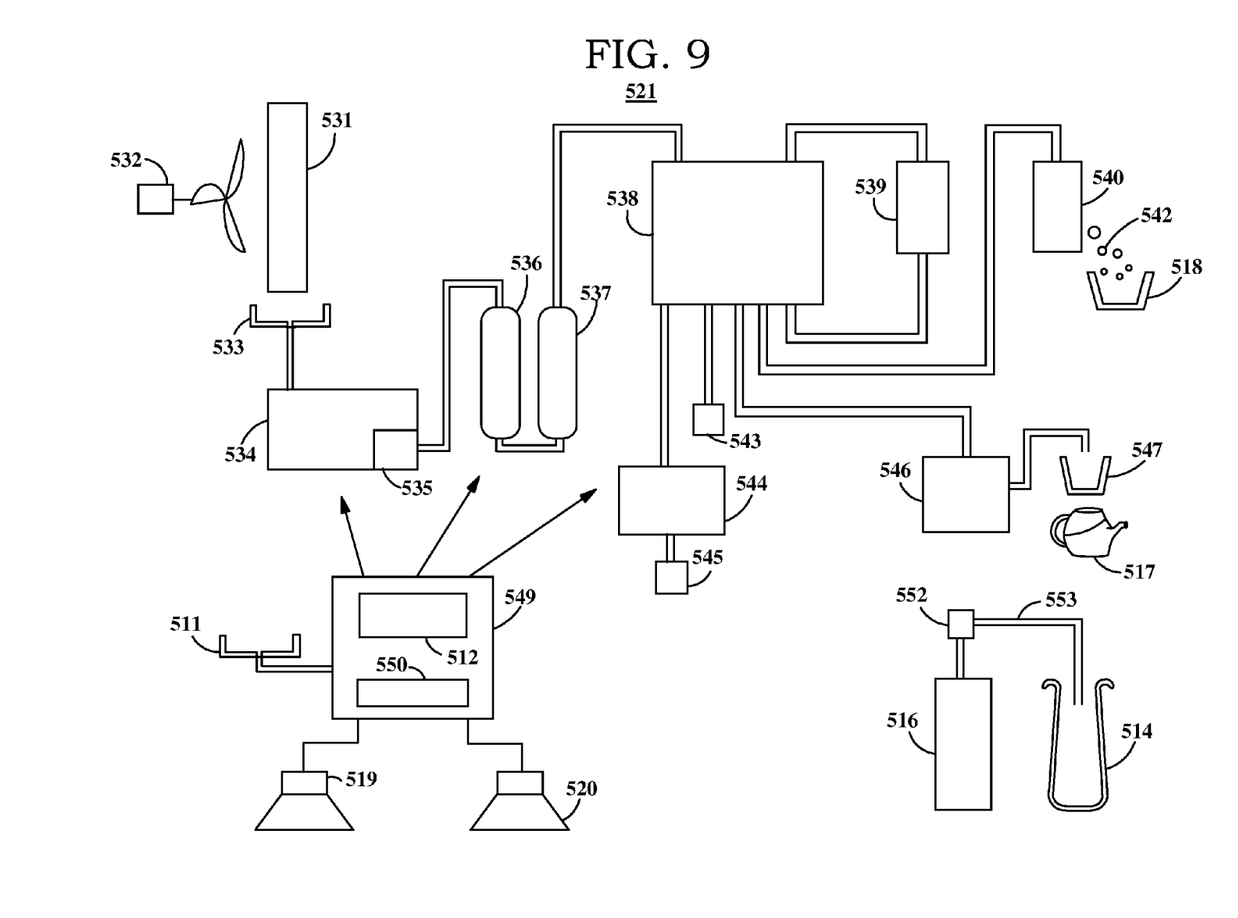
FIG. 9 is a functional block diagram of one embodiment of the system.

FIG. 9 is a functional block diagram of one embodiment of the system 521. Evaporator 531 is cold. Blower 532 blows ambient air through the evaporator. Condensate drops into drip pan 533 and is collected in tank 534. If there is a call for water from tank 538, and if the tank 534 is not empty, then pump 535 pumps water through filters 536, 537 to tank 538. Filters may be activated charcoal filters, or may be other types of filters, replaced as needed from time to time. Water from tank 538 is also made available to ice maker 540 which makes ice 542 which is stored in storage bin 541. While such ice is often loosely referred to as "ice cubes", it will be appreciated that with most ice makers the ice is actually in the form of crescents. Water from tank 538 is also made available to coffee maker 546, which provides hot water to funnel 547 which holds a coffee filter, omitted for clarity in FIG. 9. Drip coffee is captured in carafe 517.

Yet another approach is to provide a more sophisticated coffee maker, such as an espresso/cappuccino maker. Such a maker provides a source of steam or superheated water for making the beverage, and steam is also available for frothing of cream or milk for the cappuccino.

It will be appreciated that the system according to the invention offers at least two distinct benefits. One benefit is that the user, who will be drinking the beverage, will likely find it desirable that the water employed to make the beverage is essentially distilled water, and thus is free of many potential contaminants that might be found in water from other sources. A distinct benefit is that the boiler chamber used for generating steam will "lime up" as minerals accumulate. The accumulation of minerals (such as calcium or magnesium salts) can render the boiler unusable. With the present invention, however, the water will contain virtually no calcium or magnesium salts and thus the boiler chamber will not "lime up" nearly so quickly.

A compressor, omitted for clarity in FIG. 9, provides compressed refrigerant to evaporator 531, or to a jacket of tank 538, or to ice maker 540, to provide cooling for the evaporator 531, or to cool the water in tank 538, or to provide chilled air for the ice maker 540 and the ice storage bin 518. Controller 549 receives, for example, a call for cooling from a sensor at the evaporator 531, or a call for cooling from a sensor at the cold-water tank 538, or a call for cooling at the ice maker 540. After the refrigerant evaporates and provides its cooling benefit, it is compressed in the compressor and is then cooled in a condenser, omitted for clarity in FIG. 9. Water from tank 538 is passed to tank 544 where it is heated (under thermostatic control) and is dispensed at spigot 545.

Chilled water is dispensed at spigot 543. Overflow and drain lines, likewise omitted for clarity in FIG. 9, provide drain paths for unintended overflow in cold-water tank 538, hot-water tank 544, coffeemaker 546, and ice maker 540. Water may be dispensed from spigot 543 into carafe 514, which may then be set into place in the carbonation location having pipe 553. When hand-operated valve 552 is opened, carbon dioxide from tank 516 is released and carbonates the water. In this way the user receives sparking water from the air.

Controller 549 receives calls for cooling or heating and calls for water, and generally administers the day-to-day function of the system 521, with a display 512 and a keypad 550. The controller 549 will also desirably keep track of the usage of the filters 536, 537 and will recommend their replacement as appropriate.

A connector (docking station) 511 can receive audio signals and amplify the signals for speakers 519, 520. The audio signals are provided by an electronic device connected to the docking station 511. Such a device may include a MP3 player, an IPOD, an IPHONE, an audio book player, a smart-phone, a digital radio, and other electronic devices. The user may control the playback process and volume and tone at the keypad 550. As may be seen in FIGS. 6, 7, and 8, the speakers are optimally positioned angled outwards, thereby enhancing the stereo listening experience.

It will be appreciated that the term "speaker" might mean a device containing a single transducer converting electrical energy into air vibrations, or might mean a device containing two or more transducers each converting electrical energy into air vibrations. The latter is typified by a speaker containing a tweeter and a woofer. In a stereo sound reproduction system there will typically be two speakers, each of which contains one or more transducers.

The docking station 511 may merely provide an audio path but may also contain a recharging path for recharging the music player, and may also provide control signals to start and stop the player and to select programs, channels, digital audio files, and digital radio stations for play. Preferably the docking station 511 and the speakers 519, 520 are higher than the plumbing of the system 521, thereby reducing the risk that water or other liquids will contaminate or damage the docking station 511 or speakers 519, 520.

Those skilled in the art will have no difficulty devising myriad obvious variations and improvements to the invention, all of which are intended to be encompassed within the scope of the claims which follow.

The invention claimed is:

1. A system for providing drinkable water created from purified potable water derived from an atmosphere, said system comprising: a housing having an air-inlet port and an air-exhaust port; a refrigerant compressor; at least one multi-way solenoid-operated refrigerant control valve; a controller for monitoring and for controlling said at least one solenoid-operated refrigerant control valve and other electrical subsystems within the system; an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; an anti-static, anti-mold air filter, wherein said anti-static, anti-mold air filter is installed upstream of said evaporator; a condenser for the system's refrigeration cycle; a fan or blower, wherein said fan or blower circulates ambient air from said air-inlet port, through said anti-static, anti-mold air filter, across said evaporator, said condenser, then out said air-exhaust port; a collector with highly polished surfaces; a preliminary filter to remove any smell of condensate water and ammonia, wherein said preliminary filter is comprised of activated carbon or zeolite; a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint; at least one water pump; a particle filter for filtering particles to protect an intake of said at least one water pump; a water-purification filtration assembly to filter out bacteria, viruses, and heavy metals, as well as to remove unwanted smells, comprising: at least one activated carbon filter, at least one reverse-osmosis filter, wherein said reverse-osmosis filter has an aperture of less than or equal to 0.0001 µm, and wherein said reverse-osmosis filter can be back-flushed such that a waste water can be directed to said collector via a three-way valve that is controlled by a waste-water proportion controller, at least one zeolite filter; wherein said at least one water pump pumps condensate water from said condensate-collection tank through said water-purification assembly; a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint; a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purified-water-collection tank is maintained within a temperature range of 2-15 Celsius; a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; a common outlet valve, disposed at said common outlet header, that can be positioned to allow a user to obtain an output of hot or cold purified water from the system; an interface for charging and playing an audio device connected thereto; at least one speaker controlled by the system, said control effectuated through at least one of: a control panel, a remote control, or an audio device application; thereby producing air-extracted, purified water, which is available for a user to extract via said common outlet valve, and a system for charging and playing an audio device connected thereto; wherein, said air-extracted, purified water is cooled to form ice and said ice may thereafter be dispensed from the system; a coffee maker, said coffee maker comprising: a ground coffee container, the ground coffee container having an inlet for hot water or steam, and the ground coffee container having an outlet for liquid coffee.

2. The system of claim 1, wherein the purified water is heated to form steam which is may then be made available through a steam dispensing tube, wherein the flow of steam through the steam dispensing tube is controlled by a valve which may be activated by a user.

3. The system of claim 1, further comprising at least one solar panel having a rated capacity of at least 300 W to electrically power the system.

4. A system for providing drinkable water created from purified potable water derived from an atmosphere, said system comprising: a housing having an air-inlet port and an air-exhaust port; a refrigerant compressor; at least one multi-way solenoid-operated refrigerant control valve; a controller for monitoring and for controlling said at least one solenoid-operated refrigerant control valve and other electrical subsystems within the system; an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; an anti-static, anti-mold air filter, wherein said anti-static, anti-mold air filter is installed upstream of said evaporator; a condenser for the system's refrigeration cycle; a fan or blower, wherein said fan or blower circulates ambient air from said air-inlet port, through said anti-static, anti-mold air filter, across said evaporator, said condenser, then out said air-exhaust port; a collector with highly polished surfaces; a preliminary filter to remove any smell of condensate water and ammonia, wherein said preliminary filter is comprised of activated carbon or zeolite; a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint; at least one water pump; a particle filter for filtering particles to protect an intake of said at least one water pump; a water-purification filtration assembly to filter out bacteria, viruses, and heavy metals, as well as to remove unwanted smells, comprising: at least one activated carbon filter, at least one reverse-osmosis filter, wherein said reverse-osmosis filter has an aperture of less than or equal to 0.0001 µm, and wherein said reverse-osmosis filter can be back-flushed such that a waste water can be directed to said collector via a three-way valve that is controlled by a waste-water proportion controller, at least one zeolite filter; wherein said at least one water pump pumps condensate water from said condensate-collection tank through said water-purification assembly; a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint; a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purified-water-collection tank is maintained within a temperature range of 2-15 Celsius; a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; a common outlet valve, disposed at said common outlet header, that can be positioned to allow a user to obtain an output of hot or cold purified water from the system; an interface for charging and playing an audio device connected thereto; at least one speaker controlled by the system, said control effectuated through at least one of: a control panel, a remote control, or an audio device application; thereby producing air-extracted, purified water, which is available for a user to extract via said common outlet valve, and a system for charging and playing an audio device connected thereto; a coffee maker, said coffee maker comprising: a ground coffee container adapted to holding ground coffee, the ground coffee container having an inlet for hot water or steam, and the ground coffee container having an outlet for liquid coffee.

5. The system of claim 4, further comprising at least one solar panel having a rated capacity of at least 300 W to electrically power the system.

6. A system for providing ice and drinkable hot and cold water created from purified potable water derived from an atmosphere, said system comprising: a housing having an air-inlet port and an air-exhaust port; a refrigerant compressor; at least one multi-way solenoid-operated refrigerant control valve; a controller for monitoring and for controlling said at least one solenoid-operated refrigerant control valve and other electrical subsystems within the system; an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; an anti-static, anti-mold air filter, wherein said anti-static, anti-mold air filter is installed upstream of said evaporator; a condenser for the system's refrigeration cycle; a fan or blower, wherein said fan or blower circulates ambient air from said air-inlet port, through said anti-static, anti-mold air filter, across said evaporator, said condenser, then out said air-exhaust port; a collector with highly polished surfaces; a preliminary filter to remove any smell of condensate water and ammonia, wherein said preliminary filter is comprised of activated carbon or zeolite, a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint, at least one water pump; a particle filter for filtering particles to protect an intake of said at least one water pump; a water-purification filtration assembly to filter out bacteria, viruses, and heavy metals, as well as to remove unwanted smells, comprising at least one activated carbon filter, at least one reverse-osmosis filter, wherein said reverse-osmosis filter has an aperture of less than or equal to 0.0001 µm and wherein said reverse-osmosis filter can be back-flushed such that a waste water can be directed to said collector via a three-way valve that is controlled by a waste-water proportion controller, at least one zeolite filter, wherein said at least one water pump pumps condensate water from said condensate-collection tank through said water-purification assembly; a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint, a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purifiedwater-collection tank is maintained within a temperature range of 2-15 Celsius; a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; a common outlet valve, disposed at said common outlet header, that can be positioned to allow a user to obtain an output of hot or cold purified water from the system; an ice maker, the ice maker comprising: an inlet to a vessel, the inlet provided with purified water, a vessel for containing the purified water during cooling, at least one cooling loop adjacent to the vessel; and an ice dispenser; thereby allowing a user to obtain an output of ice or hot or cold purified water from the system.

7. The system of claim 6, further comprising an interface for charging and playing an audio device connected thereto.

8. The system of claim 7, further comprising a module for making and dispensing coffee drinks.

9. The system of claim 6, further comprising a module for making and dispensing coffee drinks.

10. The system of claim 6, further comprising an interface for playing an audio device connected thereto.

11. The system of claim 6, further comprising at least one solar panel having a rated capacity of at least 300 W to electrically power the system.

12. A system for providing drinkable hot and cold water created from purified potable water derived from an atmosphere and for providing coffee, said system comprising: a housing having an air-inlet port and an air-exhaust port; a refrigerant compressor; at least one multi-way solenoid-operated refrigerant control valve; a controller for monitoring and for controlling said at least one solenoid operated refrigerant control valve and other electrical subsystems within the system; an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; an anti-static, anti-mold air filter, wherein said anti-static, anti-mold air filter is installed upstream of said evaporator; a condenser for the system's refrigeration cycle; a fan or blower, wherein said fan or blower circulates ambient air from said air-inlet port, through said anti-static, anti-mold air filter, across said evaporator, said condenser, then out said air-exhaust port; a collector with highly polished surfaces; a preliminary filter to remove any smell of condensate water and ammonia, wherein said preliminary filter is comprised of activated carbon or zeolite, a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint; at least one water pump; a particle filter for filtering particles to protect an intake of said at least one water pump; a water-purification filtration assembly to filter out bacteria, viruses, and heavy metals, as well as to remove unwanted smells, comprising: at least one activated carbon filter, at least one reverse-osmosis filter, wherein said reverse-osmosis filter has an aperture of less than or equal to 0.0001 µm, and wherein said reverse-osmosis filter can be back-flushed such that a waste water can be directed to said collector via a three-way valve that is controlled by a waste-water proportion controller, at least one zeolite filter, wherein said at least one water pump pumps condensate water from said condensate-collection tank through said water-purification assembly; a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint, a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purified-water-collection tank is maintained within a temperature range of 2-15 Celsius; a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; a common outlet valve, disposed at said common outlet header, that can be positioned to allow a user to obtain an output of hot or cold purified water from the system; a coffee maker, the coffee maker comprising: a ground coffee container having an inlet, the inlet provided with at least one of: hot purified water or steam, and the ground coffee container having an outlet for liquid coffee, thereby allowing a user to obtain an output of coffee or hot or cold purified water from the system.

13. The system of claim 12, further comprising an interface for playing an audio device connected thereto.

14. The system of claim 13, further comprising a module for making and dispensing ice.

15. The system of claim 12, further comprising a module for making and dispensing ice.

16. The system of claim 15, further comprising an interface for playing an audio device connected thereto.

17. The system of claim 12, further comprising at least one solar panel having a rated capacity of at least 300 W to electrically power the system.

18. A method for making a system for providing an audio player and drinkable water derived from an atmosphere, said method comprising the steps of: providing a housing having an air-inlet port and an air-exhaust port; providing a refrigerant compressor; providing at least one multi-way solenoid-operated refrigerant control valve; providing a controller for monitoring for controlling said at least one solenoid-operated refrigerant control valve and other electrical subsystems within the system; providing an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; providing an anti-static, anti-mold air filter, wherein said anti-static, anti-mold air filter is installed upstream of said evaporator; providing a condenser for the system's refrigeration cycle; providing a fan or blower, wherein said fan or blower circulates ambient air from said air-inlet port, through said anti-static, anti-mold air filter, across said evaporator, said condenser, then out said air-exhaust port; providing a collector with highly polished surfaces; providing a preliminary filter to remove any smell of condensate water and ammonia, wherein said preliminary filter is comprised of activated carbon or zeolite; providing a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint; providing at least one water pump; providing a particle filter for filtering particles to protect an intake of said at least one water pump; providing a water-purification filtration assembly to filter out bacteria, viruses, and heavy metals, as well as to remove unwanted smells, comprising: at least one activated carbon filter, at least one reverse-osmosis filter, wherein said reverse-osmosis filter has an aperture of less than or equal to 0.0001 μm, and wherein said reverse-osmosis filter can be back-flushed such that a waste water can be directed to said collector via a three-way valve that is controlled by a waste-water proportion controller, at least one zeolite filter; wherein said at least one water pump pumps condensate water from said condensate-collection tank through said water-purification assembly; providing a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint; providing a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purified-water-collection tank is maintained within a temperature range of 2-15 Celsius; providing a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; providing a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; providing a common outlet valve, disposed at said common outlet header, that can be positioned to allow a user to obtain an output of hot or cold purified water from the system; and providing an interface for charging and playing an audio device connected thereto; providing at least one speaker within or connected to said housing; and thereby providing a method for making a system for providing an audio player and air extracted, purified water, the purified water being thereby available for a user to extract via said common outlet valve.

19. The method of claim 18, wherein the interface for charging and playing an audio device is adapted to play audio files transmitted from: an MP3 player, a smart-phone, a digital radio, an audio book player, or an MP4 player.

20. The method of claim 18, wherein the method further comprises: providing at least one $CO_2$ gas cylinder, stored within said housing and removable, equipped with a one-way valve, a valve stem, an outlet-release valve, and a pressure relief valve; providing a gas-diffusion chamber, stored within said housing and removable, equipped with an inlet valve and a pressure-relief valve, wherein said controller will set off an alarm if said pressure relief valve's spring pressure setting is set above a predetermined value, and wherein said gas-diffusion chamber contains an effective amount of purified water user-determined, obtained by a user by manually filling said $CO_2$ gas a predetermined level with purified water obtained from said common outlet valve of the system; providing a gas line used to communicatively couple said at least one $CO_2$ gas cylinder and said gas-diffusion chamber; and a spring-loaded lever communicatively coupled to said at least one $CO_2$ gas cylinder valve stem such that when said lever is depressed, said at least one $CO_2$ gas cylinder valve stem opens said outlet-release valve, said at least one $CO_2$ gas cylinder one-way valve releases pressurized gas into said gas line and into said gas-diffusion chamber via a trachea pipe within said gas-diffusion chamber, and once said gas-diffusion chamber realizes a saturated content of purified water and $CO_2$ gas (that is, said purified water has become sufficiently carbonated), said outlet-release valve opens, thus signaling a user to release said spring-loaded lever to stop the transfer of gas between said at least one $CO_2$ gas cylinder and said gas-diffusion chamber; thereby carbonating air-extracted, purified water, which is available for a user to extract via said outlet-release valve.

21. The method of claim 20, further comprising a step of providing at least one solar panel having a rated capacity of at least 300 W to electrically power the system.

22. The method of claim 18, wherein the purified water is cooled to form ice and the ice may be dispensed to a user.

23. The method of claim 22, wherein said purified water is heated and passed through a chamber containing ground coffee to form a liquid coffee beverage which may be dispensed to a user.

24. The method of claim 18, wherein said purified water is heated and passed through a chamber containing ground coffee to form a liquid coffee beverage which may be dispensed to a user.

25. The method of claim 24, further comprising the step of cooling the purified water to form ice and the ice may be dispensed to a user.

26. The method of claim 18, wherein: said refrigerant compressor is a controllable, variable-speed, high-efficiency compressor; said refrigerant compressor is controlled by an inverter-controller; duty cycles and operation of said refrigerant compressor can be user-adjusted at an onboard control panel via said inverter-controller; and a user can program the system to operate said refrigerant compressor at optimum efficiency according to the environmental conditions.

27. The method of claim 18, further comprising a step of providing at least one solar panel having a rated capacity of at least 300 W to electrically power the system.

28. A method for making a system for providing ice and drinkable water derived from an atmosphere, said method comprising the steps of: providing a housing having an air-inlet port and an air-exhaust port; providing a refrigerant compressor; providing at least one multi-way solenoid-operated refrigerant control valve; providing a controller for monitoring and for controlling said at least one solenoid-operated refrigerant control valve and other electrical subsystems within the system; providing an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; providing an anti-static, anti-mold air filter, wherein said anti-static, anti-mold air filter is installed upstream of said evaporator; providing a condenser for the system's refrigeration cycle; providing a fan or blower, wherein said fan or blower circulates ambient air from said air-inlet port, through said anti-static, anti-mold air filter, across said evaporator, said condenser, then out said air-exhaust port; providing a collector with highly polished surfaces; providing a preliminary filter to remove any smell of condensate water and ammonia, wherein said preliminary filter is comprised of activated carbon or zeolite; providing a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint; providing at least one water pump; providing a particle filter for filtering particles to protect an intake of said at least one water pump; providing a water-purification filtration assembly to filter out bacteria, viruses, and heavy metals, as well as to remove unwanted smells, comprising: at least one activated carbon filter, at least one reverse-osmosis filter, wherein said reverse-osmosis filter has an aperture of less than or equal to 0.0001 µm, and wherein said reverse-osmosis filter can be back-flushed such that a waste water can be directed to said collector via a three-way valve that is controlled by a waste-water proportion controller, at least one zeolite filter; wherein said at least one water pump pumps condensate water from said condensate-collection tank through said water-purification assembly; providing a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint; providing a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purified-water-collection tank is maintained within a temperature range of 2-15 Celsius; providing a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; providing a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; providing a common outlet valve, disposed at said common outlet header, that can be positioned to allow a user to obtain an output of hot or cold purified water from the system; and providing an ice maker comprising: an inlet to a vessel, the inlet provided with purified water, a vessel for containing the purified water during cooling, at least one cooling loop adjacent to the vessel; and an ice dispenser having an ice release mechanism; thereby providing a method for making a system for producing air-extracted, purified water and ice, the purified water being thereby available for a user to extract via said common outlet valve, and the ice being available for a user to extract through said ice release mechanism.

29. The method of claim 28, further comprising a step of providing a coffee maker, the coffee maker using heated purified water passed through a chamber containing ground coffee to form a liquid coffee beverage which may be dispensed to a user.

30. The method of claim 28, further comprising a step of providing at least one solar panel having a rated capacity of at least 300 W to electrically power the system.

31. A method for making a system for providing coffee and drinkable water derived from an atmosphere, said method comprising the steps of: providing a housing having an air-inlet port and an air-exhaust port; providing a refrigerant compressor; providing at least one multi-way solenoid-operated refrigerant control valve; providing a controller for monitoring and for controlling said at least one solenoid-operated refrigerant control valve and other electrical subsystems within the system; providing an evaporator, wherein said evaporator has fins for maximizing surface-area contact and heat transfer with ambient air, wherein said fins are coated with non-toxic, anti-corrosion materials that comply with applicable regulatory food standards for paint or a PTFE protective layer, said coating promoting rapid collection of condensate water, and wherein said evaporator can be configured by said at least one solenoid-operated refrigerant control valve to receive chilled refrigerant as pumped from said refrigerant compressor to chill air passing across said evaporator fins, and wherein said evaporator can be configured by said at least one solenoid-operated refrigerant control valve to receive hot refrigerant as pumped from said refrigerant compressor to defrost said evaporator fins; providing an anti-static, anti-mold air filter, wherein said anti-static, anti-mold air filter is installed upstream of said evaporator; providing a condenser for the system's refrigeration cycle; providing a fan or blower, wherein said fan or blower circulates ambient air from said air-inlet port, through said anti-static, anti-mold air filter, across said evaporator, said condenser, then out said air-exhaust port; providing a collector with highly polished surfaces; providing a preliminary filter to remove any smell of condensate water and ammonia, wherein said preliminary filter is comprised of activated carbon or zeolite; providing a condensate-collection tank, wherein said highly polished surfaces of said collector facilitate gravity flow of condensate water into said condensate-collection tank, and wherein said condensate-collection tank is equipped with a water-level detector, said water-level detector and controller causing said evaporator to stop receiving chilled refrigerant at a predetermined high-level setpoint; providing at least one water pump; providing a particle filter for filtering particles to protect an intake of said at least one water pump; providing a water-purification filtration assembly to filter out bacteria, viruses, and heavy metals, as well as to remove unwanted smells, comprising: at least one activated carbon filter, at least one reverse-osmosis filter, wherein said reverse-osmosis filter has an aperture of less than or equal to 0.0001 µm, and wherein said reverse-osmosis filter can be back-flushed such that a waste water can be directed to said collector via a three-way valve that is controlled by a waste-water proportion controller, at least one zeolite filter; wherein said at least one water pump pumps condensate water from said condensate-collection tank through said water-purification assembly; providing a purified-water-collection tank for collecting purified water, wherein said purified-water-collection tank is equipped with a water-level detector, said water-level detector and controller causing said at least one water pump to stop pumping new purified water into said purified-water-collection tank at a predetermined high-level setpoint; providing a cooling loop disposed within said purified-water-collection tank, wherein said cooling loop can be configured by said at least one solenoid-operated refrigerant control valve to receive refrigerant as pumped from said refrigerant compressor to cool said purified water, and wherein a temperature of said purified water in the purified-water-collection tank is maintained within a temperature range of 2-15 Celsius; providing a sterilization system for killing biological material and viruses within said purified-water-collection tank, comprising an ultra-violet light device and sterilization chamber, said ultra-violet light device having an effective sterilization rate of at least 99.99%, using a wavelength in a range of 253-255 nm; providing a hot-water tank that receives purified water from said purified-water-collection tank through gravity drain, wherein said hot-water tank contains an electrical heating element, wherein the purified water within said hot-water tank is within a range of 50-95 Celsius, as controlled by said controller, and wherein to provide hot, potable water for a user, said hot, potable water can be pumped by a hot-water pump through an electrically operated valve and an output filter to a common outlet header; providing a common outlet valve, disposed at said common outlet header, that can be positioned to allow a user to obtain an output of hot or cold purified water from the system; and providing a coffee maker, the coffee maker comprising: a ground coffee container having an inlet, the inlet provided with at least one of: hot purified water or steam, and the ground coffee container having an outlet for liquid coffee; thereby providing a method for making a system for producing air-extracted, purified water and coffee, thereby available for a user to extract via said common outlet valve.

32. The method of claim 31, further comprising a step of providing at least one solar panel having a rated capacity of at least 300 W to electrically power the system.

\* \* \* \* \*